US006731587B1

United States Patent
Mizuno et al.

(10) Patent No.: US 6,731,587 B1
(45) Date of Patent: May 4, 2004

(54) TRANSDUCER-SUPPORTING STRUCTURE

(75) Inventors: Osamu Mizuno, Osaka (JP); Yutaka Murakami, Hirakata (JP); Hisayuki Enshu, Jyoyo (JP); Hideki Aikoh, Higashi-osaka (JP); Tohru Nakamura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/979,242

(22) PCT Filed: May 17, 2000

(86) PCT No.: PCT/JP00/03152

§ 371 (c)(1),
(2), (4) Date: Feb. 22, 2002

(87) PCT Pub. No.: WO00/72313

PCT Pub. Date: Nov. 30, 2000

(30) Foreign Application Priority Data

May 19, 1999 (JP) .......................................... 11/138184

(51) Int. Cl.[7] .............................................. G11B 17/32
(52) U.S. Cl. ....................................................... 369/244
(58) Field of Search ................................ 369/246, 247, 369/248, 244, 244.1; 360/245.5, 244.1

(56) References Cited

U.S. PATENT DOCUMENTS

| | | | | |
|---|---|---|---|---|
| 4,394,530 A | * | 7/1983 | Kaufman ..................... 174/16.3 |
| 5,114,913 A | * | 5/1992 | Coufal et al. ................ 505/171 |
| 5,712,748 A | * | 1/1998 | Masse ........................ 360/245.3 |
| 5,808,834 A | * | 9/1998 | Jurgenson ................. 360/234.5 |
| 5,943,188 A | | 8/1999 | Kazama |
| 5,956,211 A | * | 9/1999 | Adley ....................... 360/244.1 |
| 5,968,606 A | * | 10/1999 | Osuna et al. ................ 427/510 |
| 6,009,051 A | * | 12/1999 | Kazama .................... 369/13.17 |
| 6,021,844 A | * | 2/2000 | Batchelder ................. 165/80.3 |
| 6,144,530 A | * | 11/2000 | Shiraishi et al. .......... 360/244.1 |
| 6,268,980 B1 | * | 7/2001 | Shiraishi et al. .......... 360/234.5 |
| 6,282,062 B1 | * | 8/2001 | Shiraishi ................... 360/244.1 |
| 6,307,719 B1 | * | 10/2001 | Mallary .................... 360/294.7 |
| 6,404,706 B1 | * | 6/2002 | Stovall et al. ........... 369/13.17 |

FOREIGN PATENT DOCUMENTS

| | | |
|---|---|---|
| JP | 55-058822 | 5/1980 |
| JP | 6-195851 | 7/1994 |
| JP | 7-129902 | 5/1995 |
| JP | 8-63923 | 3/1996 |
| JP | 8-138338 | 5/1996 |
| JP | 8-235556 | 9/1996 |
| JP | 10-124802 | 5/1998 |
| JP | 10-283604 | 10/1998 |

OTHER PUBLICATIONS

International Search Report corresponding to PCT/JP00/03152 dated Jul. 18, 2000.
English Translation of International Search Report corresponding to PCT/JP00/03152.
International Search Report corresponding to PCT/JP00/03152 dated Jul. 4, 2002.

* cited by examiner

Primary Examiner—George J. Letscher
Assistant Examiner—C R Beacham
(74) Attorney, Agent, or Firm—RatnerPrestia

(57) ABSTRACT

In high-speed high-density recording, heat generation becomes a problem as high-frequency modulation and strong magnetic field of a magnetic head are realized.

A thermally coupling contact portion is extended from a part of a suspension and is brought into contact with a magnetic core, by which heat generated in a coil is dissipated to the suspension via the magnetic core and the thermally coupling contact portion.

6 Claims, 12 Drawing Sheets

TRANSDUCER-SUPPORTING STRUCTURE

THIS APPLICATION IS A U.S. NATIONAL PHASE APPLICATION OF PCT INTERNATIONAL APPLICATION PCT/JP00/03152.

TECHNICAL FIELD

The present invention relates to a structure for supporting a transducer for recording or reproducing information on or from a recording medium mainly by an interaction with the recording medium, specifically, by the action of light, heat, magnetic field, or the like.

BACKGROUND ART

As a conventional example of a transducer-supporting structure, for example, a structure for supporting a magnetic core for magnetic recording is cited. As a medium, a magnetic tape or a flexible disk has been used, and in recent years, a minidisk (hereinafter abbreviated to MD) has been widely used as a magneto-optical recording medium mainly for music. The MD is based on the use of a sliding-type magnetic head slider for magneto-optical field modulation overwrite.

Next, a magnetic head structure mainly for MD will be discussed as an example of a conventional transducer-supporting structure. This example has been disclosed in Japanese Patent Laid-Open No. 6-195851. FIG. 10(a) shows an entire structure.

In FIG. 10(a), reference numeral 101 denotes a slider serving as a transducer mounting section. In general, the main function of the transducer mounting section is to interface with a medium. In this example, the slider comes into slidable contact with the medium to maintain a distance between a transducer and the medium.

The slider for a fixed magnetic disk keeps the distance between the transducer and the medium by means of floating. For the magnetic tape, flexible disk, and the like, although the transducer itself comes into contact with the medium, the contact pressure between the medium and the transducer is decreased by the expansion of sliding face, by which the transducer is prevented from wearing.

The slider 101 is mounted with a magnetic core 102 having an E shape in cross section, formed of ferrite etc., and a coil 104 (described later), both of which serve as a transducer. Reference numeral 103 denotes a suspension formed of a metallic elastic material such as stainless steel, beryllium copper, and phosphor bronze. The slider 101 is connected to the distal end of the suspension 103.

The details of the sliding face of the slider 101, which have been disclosed in Japanese Patent Laid-Open No. 7-129902, are shown in FIG. 10(b). On the face opposed to disk of the slider 101, a cylindrical face 101a that comes into contact with a disk 10 (described later) is formed as a sliding face. Reference numeral 102a denotes a magnetic pole exposed on the disk side of the magnetic core 102. The cylindrical face 101a projects by a predetermined amount toward the disk from the magnetic pole 102a.

The slider 101 including the cylindrical face 101a uses a slidable resin material having high wear resistance and some degree of lubricity on the face opposed to disk, which has an effect of preventing the slider 101 and the disk 10 from wearing.

FIG. 11 shows an essential part of the distal end of a magnetic head structure. A tongue 103c is formed at the distal end of the suspension 103, and is connected to the slider 101.

When the slider 101 comes into slidable contact with the disk 10, which is a recording medium, a spring portion 103a is deformed elastically to apply a predetermined load in the direction toward the disk to the slider 101. Thereby, a gimbal portion 103b is deformed elastically to keep the relative posture of the slider 101 and the disk 10 with respect to the disk inclination, so that the magnetic pole 102a is brought close to a recording film of the disk 10.

FIG. 12 shows a sliding state. The slider 101 serving as a transducer mounting section has a box portion. In the box portion, the aforementioned magnetic core 102 is housed and fixed, and also an inside bottom face S of the box portion, which is in contact with the lower end face of the magnetic core 102, plays a role in determining the relative height of the magnetic core 102. The disk 10 moves in the direction indicated by an arrow A.

In this state, a modulated magnetic field produced by the coil 104 is induced by the magnetic core 102 and is applied from the magnetic pole 102a to the recording film heated by a converged laser beam, by which thermomagnetic recording is performed.

However, the above-described conventional transducer-supporting structure has problems described below.

In order to enhance the performance of equipment, for example, in order to increase the transfer rate of recorded information, it is necessary to increase the modulation frequency of magnetic field. Also, in order to achieve a high density, it is necessary to increase the intensity of magnetic field. Power consumption in the magnetic core 102 and the coil 104, serving as an electromagnetic transducer, is caused by an eddy current loss and a high frequency loss such as a skin effect in the former case and coil resistance etc. in the latter case.

The consumed electric power turns to heat, which raises the temperatures of both of the magnetic core 102 and the coil 104. Since the slider 101 is made of a resin material, which is a kind of thermal insulator, it is difficult to dissipate the heat of the electromagnetic transducer within the slider 101, so that slight generation of heat leads to a great increase in temperature.

On the other hand, a magnetic material used for the magnetic core etc. generally has a Curie point. When a high-frequency large current is caused to flow, a temperature rise exceeding the Curie point due to the generation of heat loses the magnetism and extremely decreases the impedance. Therefore, there occurs a thermorunaway phenomenon that a large current flows, resulting in a temperature rise, and finally the burning of coil and the destruction of driving circuit take place.

Also, for another transducer, for example, an electro-optical transducer such as laser, a shorter wavelength is important to high-density recording and reproduction. However, light with a short wavelength has high energy, so that heat is generated greatly. On the other hand, for a semiconductor laser, the operating temperature has a great influence on the service life, so that a shorter wavelength cannot be achieved easily.

That is, in various types of transducers, a temperature rise greatly restricts the enhancement of performance.

Also, in the conventional example, the magnetic core 102 is fixed to the slider 101 by means of bonding etc. However, a change in temperature occurs as described above, and the coefficient of thermal expansion differs greatly between the magnetic core 102 and the slider 101. Also, the slider 101 has a poor adhesive property because of being made of a slidable resin. Therefore, if thermal expansion and contraction are repeated for a long period of time, there arises a problem of reliability in that adhesion is lost, and thus the magnetic core 102 floats from the slider 101, so that a sufficient magnetic field cannot be given to the recording film.

DISCLOSURE OF THE INVENTION

The present invention has been achieved to solve the above problems, and accordingly an object thereof is to provide a highly reliable transducer-supporting structure in which a rise in temperature is reduced, whereby the performance can be enhanced easily.

One aspect of the present invention is a transducer-supporting structure, characterized in that said structure at least comprises:

a transducer for recording and reproducing information on and from a medium;

a transducer mounting section which is mounted with said transducer and comes into contact with said medium by means of mechanical action or keeps a fixed distance from said medium;

a suspension which supports said transducer mounting section and elastically positions said transducer in the direction such as to bring and separate said transducer close to and from said medium; and a thermal coupling member formed of a part of said suspension for thermally coupling said transducer with said suspension in direct contact with said transducer, and at least a part of heat generated in said transducer is dissipated through said suspension.

Another aspect of the present is the transducer-supporting structure, characterized in that said thermal coupling member has an elastic restoring force, and is in contact with said transducer.

Still another aspect of the present invention is the transducer-supporting structure, characterized in that said transducer is an electromagnetic transducer.

Yet still another aspect of the present invention is the transducer-supporting, characterized in that said transducer is an electro-optical transducer.

Still yet another aspect of the present invention is a transducer-supporting structure, characterized in that said structure at least comprises:

a transducer for recording and reproducing information on and from a medium;

a transducer mounting section which is mounted with said transducer and comes into contact with said medium by means of mechanical action or keeps a fixed distance from said medium;

a suspension which supports said transducer mounting section and elastically positions said transducer in the direction such as to bring and separate said transducer close to and from said medium; and a thermal coupling member for thermally coupling said transducer with said suspension, and said thermal coupling member and said transducer or said thermal coupling member and said suspension are at least partially coupled thermally with each other via a viscous fluid; and at least a part of heat generated in said transducer is dissipated through said suspension.

A further aspect of the present is a transducer-supporting structure, characterized in that said structure at least comprises:

a transducer for recording and reproducing information on and from a medium;

a transducer mounting section which is mounted with said transducer and comes into contact with said medium by means of mechanical action or keeps a fixed distance from said medium;

a suspension which supports said transducer mounting section and elastically positions said transducer in the direction such as to bring and separate said transducer close to and from said medium; and a thermal coupling member for thermally coupling said transducer with said suspension, and said thermal coupling member is a gel-form substance, and said transducer and said suspension are coupled thermally with each other via said gel-form substance; and at least a part of heat generated in said transducer is dissipated through said suspension.

A still further aspect of the present invention is a transducer-supporting structure, characterized by at least comprising:

a transducer for recording and reproducing information on and from a medium;

heat dissipating means is formed integrally with said transducer; and a suspension for holding said transducer at a desired position with respect to said recording medium.

A yet further aspect of the present invention is the transducer-supporting, characterized in that said transducer is an electromagnetic transducer.

FIG. 7 shows an essential part of a transudcer-supporting structure in accordance with a third embodiment of the present invention. A slider 1, a magnetic core 2, a coil 4, and a disk 10 are the same as those elements of the first embodiment. Although the whole of a suspension is not shown in FIG. 7, the suspension is approximately the same as the suspension 3 of the first embodiment, and a gimbal portion 23b is the same as the gimbal portion 3b of the first embodiment.

[Explanation of reference numerals]

| | |
|---|---|
| 1, 6 | slider |
| 2, 42 | magnetic core |
| 3, 33 | suspension |
| 3d, 13d | thermally coupling contact portion |
| 15, 25 | heat conductive material |
| 8a | semiconductor laser |
| 42b | heat dissipating portion |

EST MODE FOR CARRYING OUT THE INVENTION

Embodiments of the present invention will now be described with reference to FIGS. 1 to 9 below.

First Embodiment

Figure 1:
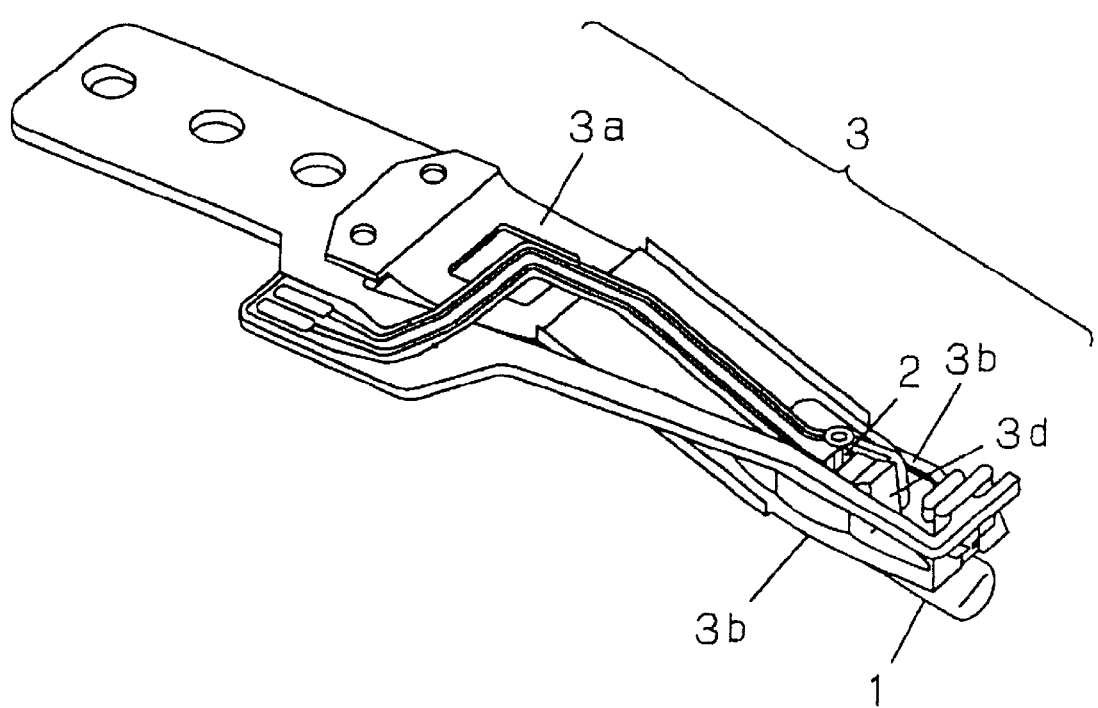
FIG. 1 is a perspective view of a transducer-supporting structure in accordance with a first embodiment of the present invention.

FIG. 1 is a general view of a transducer-supporting structure in accordance with a first embodiment of the present invention. A slider 1 and a magnetic core 2 are the same as the slider 101 and the magnetic core 102 in the conventional example in respect of material and detailed construction. Reference numeral 3 denotes a suspension. The suspension 3 corresponds to the suspension 103 in the conventional example. A spring portion 3a and a gimbal portion 3b are the same as the spring portion 103a and the gimbal portion 103b in the conventional example.

Figure 2:
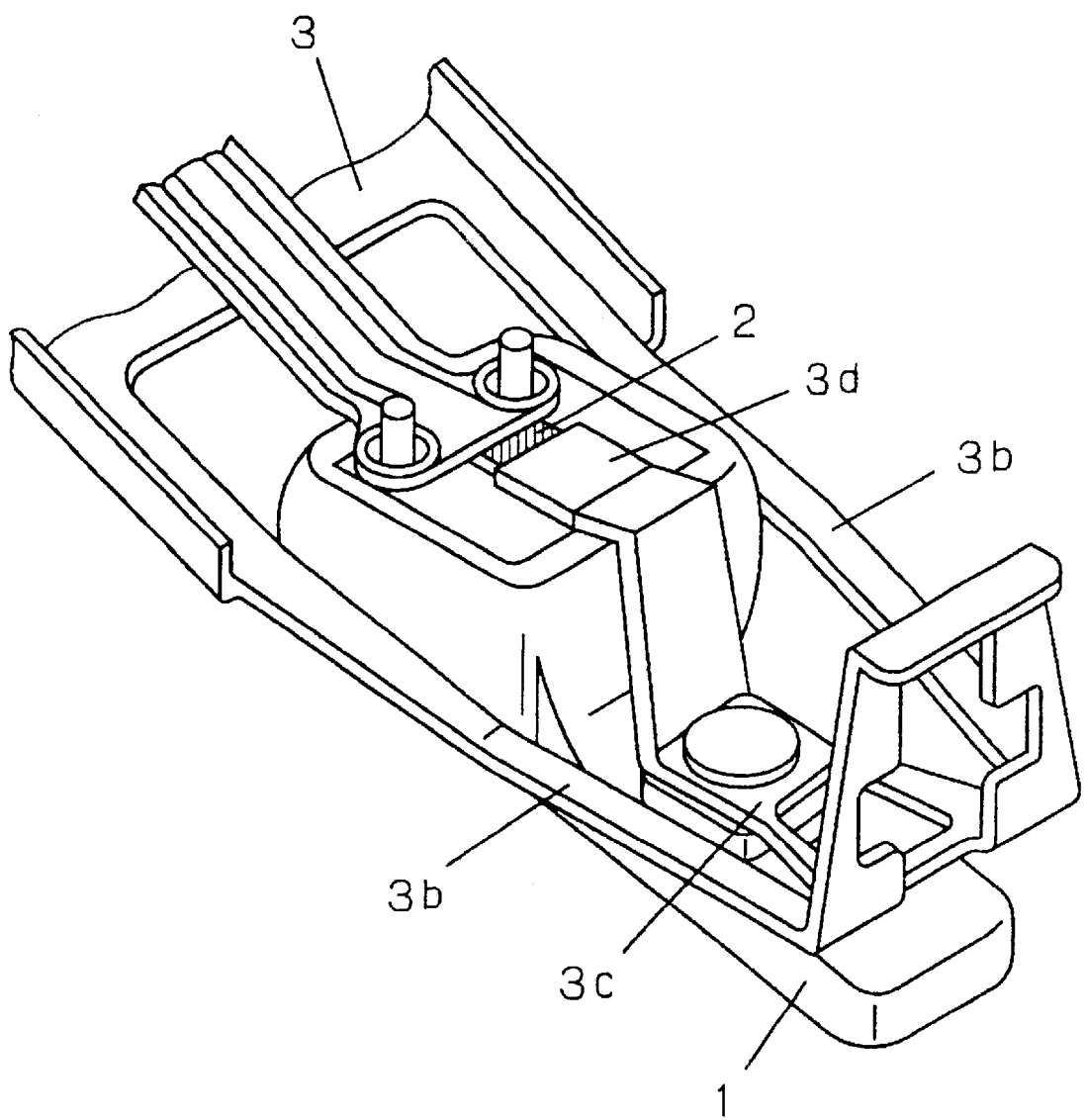
FIG. 2 is a perspective view of an essential part of the transducer-supporting structure shown in FIG. 1.

FIG. 2 shows an essential part of the transducer-supporting structure in accordance with the first embodiment of the present invention. A tongue 3c, which is the same as the tongue 103c in the conventional example, is connected to the slider 1. Reference numeral 3d denotes a thermally coupling contact portion serving as a thermal coupling member and a contact portion. The thermally coupling contact portion 3d is configured so as to extend from the tongue 3c as a part of the suspension 3, and the end part thereof is in contact with the magnetic core 2, which forms a part of an electromagnetic transducer, with a relatively wide area.

Figure 3:
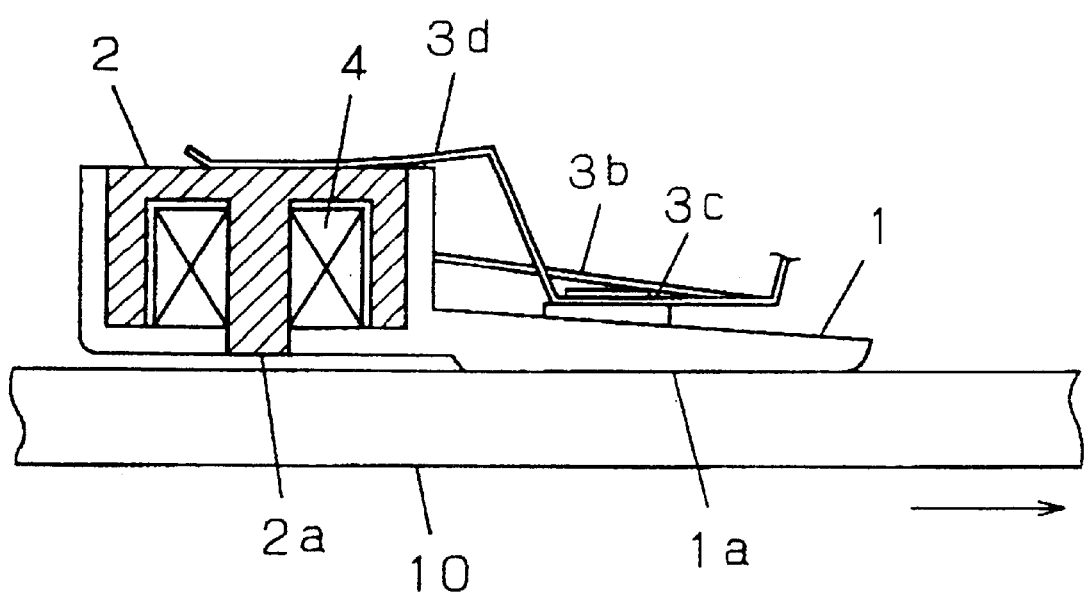
FIG. 3 is an explanatory view of an essential part of the transducer-supporting structure shown in FIG. 1.

As shown in FIG. 3, the slider 1 is mounted with the magnetic core 2 and a coil 4, serving as an electromagnetic transducer. The coil 4 is the same as the coil 104 in the conventional example. The thermally coupling contact portion 3d presses the magnetic core 2 on the slider 1 to position and fix the magnetic core 2 by means of a residual elastic restoring force.

The following will be a description of the operation of the transducer-supporting structure constructed as described above.

As in the conventional example, when the slider 1 comes into slidable contact with a disk 10, which is a recording medium, as shown in FIG. 3, the spring portion 3a is deformed elastically to apply a predetermined load in the direction toward the disk to the slider 1. Thereby, a gimbal portion 3b is deformed elastically to keep the relative posture of the slider 1 and the disk 10 with respect to the disk inclination, so that a magnetic pole 2a is brought close to a recording film of the disk 10.

In this state, a modulated magnetic field produced by the coil 4 is applied from the magnetic pole 2a to the recording film heated by a converged laser beam, by which thermomagnetic recording is performed.

The electric power consumed in the electromagnetic transducer composed of the magnetic core 2 and the coil 4 turns to heat, which raises the temperature. However, since the thermally coupling contact portion 3d, which is a part of the suspension 3, is in contact with the magnetic core 2 with a relatively wide contact region, the thermal resistance between the thermally coupling contact portion 3d and the magnetic core 2 is low. On the other hand, the suspension 3, which is a good conductor formed of a metal such as stainless steel and beryllium copper, has high thermal conductivity due to free electrons.

Thereupon, if a heat flow is produced in the thermally coupling contact portion 3d from the magnetic core 2 via a contact region, the heat flow goes into the tongue 3c and the gimbal portion 3b, so that the temperature of the whole of the suspension 3 increases as compared with the surrounding environment, and the heat is dissipated from the whole area.

Accordingly, by the heat dissipation from the suspension 3, a rise in temperature of the magnetic core 2 can be restrained, and also a rise in temperature of the coil 4 connected to the magnetic core 2 can also be restrained.

Also, since the thermally coupling contact portion 3d always presses the magnetic core 2 on the slider 1 in the insertion direction, the floating of the magnetic core 2 due to thermal expansion etc. can be prevented.

Although the thermally coupling contact portion 3d is formed by integrating a thermal coupling member for inducing heat flow in the suspension 3 with a contact portion for pressing the magnetic core 2 on the slider 1 in this embodiment, the thermal coupling member and the contact portion may be separate parts, for example, to make optimum design of these elements individually.

Figure 4:
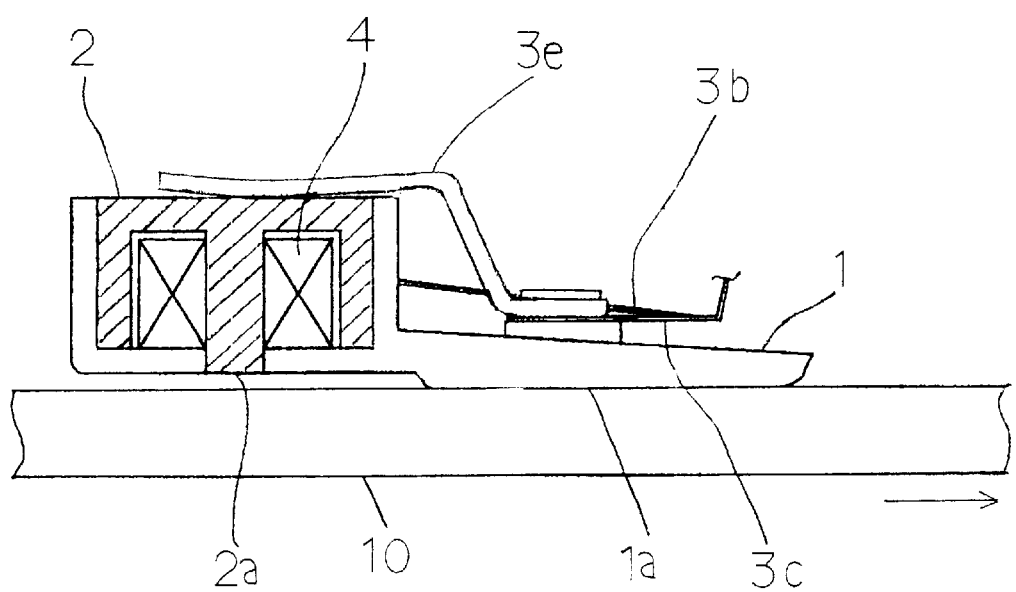
FIG. 4 is an explanatory view of an essential part of a transducer-supporting structure in accordance with another embodiment of the present invention.

Also, although for a thermally coupling contact portion, the thermally coupling contact portion 3d which is formed of the suspension 3, that is, formed by extending the tongue 3c has been described as an example in the above-described embodiment, a separate elastic member 3e with high thermal conductivity may be interposed between the tongue 3c and the magnetic core 2 as shown in FIG. 4.

Figure 5:
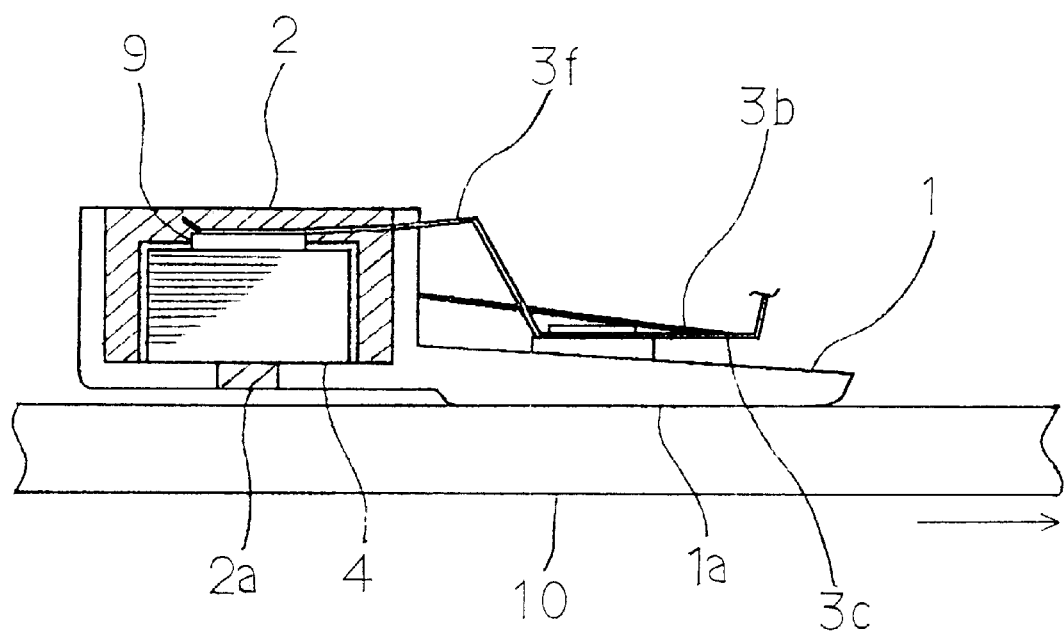
FIG. 5 is an explanatory view of an essential part of a transducer-supporting structure in accordance with still another embodiment of the present invention.

Also, although the thermally coupling contact portion 3d is in contact with the magnetic core 2 forming a part of a transducer in this embodiment, the thermally coupling contact portion 3d can be brought into contact with the coil 4 while an eddy current loss, a short circuit, and the like troubles are avoided by interposing a spacer 9 or the like as shown in FIG. 5. In this case, a change in height of the coil 4 can be restrained, the inductance can be stabilized, and the efficiency of magnetic flux with respect to the coil current can be kept at a high level.

Second Embodiment

Figure 6:
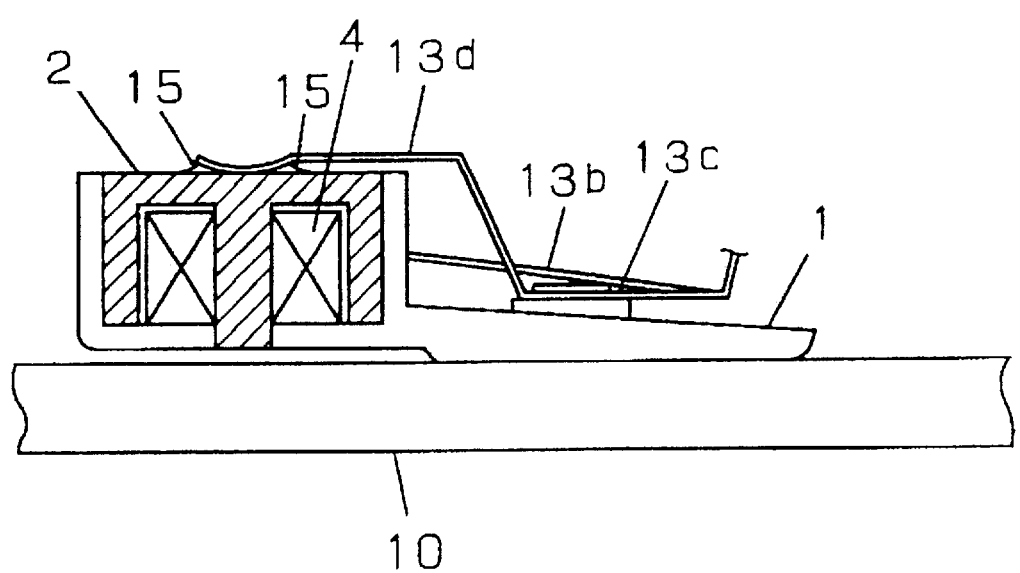
FIG. 6 is a view of a transducer-supporting structure in accordance with a second embodiment of the present invention.

FIG. 6 shows an essential part of a transducer-supporting structure in accordance with a second embodiment of the present invention. A slider 1, a magnetic core 2, a coil 4, and a disk 10 are the same as those elements of the first embodiment. Although the whole of a suspension 13 is not shown in FIG. 6, the suspension 13 is approximately the same as the suspension 3 of the first embodiment, and a gimbal portion 13b is the same as the gimbal portion 3b of the first embodiment.

A tongue 13c is the same as the tongue 3c of the first embodiment, and is connected to the slider 1. Reference numeral 13d denotes a thermally coupling contact portion serving as a thermal coupling member and a contact portion. The thermally coupling contact portion 13d is configured so as to extend from the tongue 13c as a part of the suspension 13, and the tip end thereof is formed into a substantially arcuate shape so as to be in point or line contact with a substantially central portion of the magnetic core 2, which forms a part of an electromagnetic transducer. The thermally coupling contact portion 13d presses the magnetic core 2 on the slider 1 to position and fix the magnetic core 2 by means of a residual elastic restoring force.

Reference numeral 15 denotes a viscous liquid material with relatively high thermal conductivity, such as a gel-form heat conductive material. For example, silicone grease is preferably selected as the heat conductive material 15. The heat conductive material 15 is stuck in the vicinity of a contact region of the thermally coupling contact portion 13d and the magnetic core 2.

The operation etc. of the transducer-supporting structure constructed as described above is approximately the same as those of the first embodiment, so that an explanation thereof is omitted, and different points will mainly be described.

As in the case of the first embodiment, the thermally coupling contact portion 13d presses the magnetic core 2 toward the slider 1 to prevent the magnetic core 2 from floating. In this embodiment, since the thermally coupling contact portion 13d presses the magnetic core 2 while being in point or line contact with a substantially central portion of the magnetic core 2, the inclination of pressing force in the direction of insertion of the magnetic core 2 is small, so that the inclination of the magnetic core 2 can be prevented.

Also, since the contact are a of the thermally coupling contact portion 13d and the magnetic core 2 is smaller than that of the first embodiment, the thermal resistance at the direct contact point of these elements is high. However, the heat conductive material 15 stuck in the vicinity of the contact region thermally couples the thermally coupling contact portion with the magnetic core 2 in a wide area, so that the thermal resistance is low as a whole, and thus the heat flow from the electromagnetic transducer is dissipated to the suspension as in the case of the first embodiment.

The heat conductive material 15 used in this embodiment can be used in the first embodiment without any trouble. In this case, the thermal resistance can be reduced more.

Third Embodiment

Figure 7:
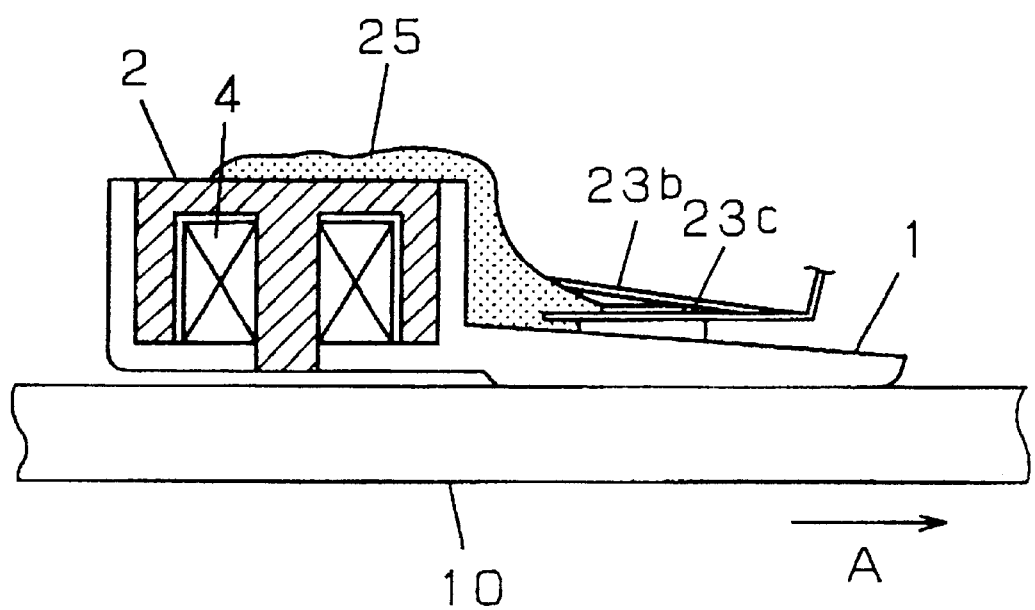
FIG. 7 is a view of a transducer-supporting structure in accordance with a third embodiment of the present invention.

FIG. 7 shows an essential part of a transducer-supporting structure in accordance with a third embodiment of the present invention. A slider 1, a magnetic core 2, a coil 4, and a disk 10 are the same as those elements of the first embodiment. Although the whole of a suspension is not shown in FIG. 7, the suspension is approximately the same as the suspension 3 of the first embodiment, and a gimbal portion 23b is the same as the gimbal portion 3b of the first embodiment.

A tongue 23c is approximately the same as the tongue 103c of the conventional example, and is connected to the slider 1. However, the tongue 23c differs from the tongue 103c in that it extends longer toward the magnetic core 2 than the tongue 103c. Reference numeral 25 denotes a gel-form heat conductive material with relatively high thermal conductivity. In this embodiment, the heat conductive material 25 functions as a thermal coupling member, and is applied to the magnetic core 2, the tongue 23c, and a gap there between.

The operation etc. of the transducer-supporting structure constructed as described above is approximately the same as those of the first embodiment, so that an explanation thereof is omitted, and different points will mainly be described.

As in the case of the first embodiment, the heat conductive material 25 can achieve heat dissipation from the whole of the suspension by causing the heat of the magnetic core 2 to flow to the tongue 23c. Although having no effect of preventing the floating of the magnetic core 2 unlike the first embodiment, the heat conductive material 25 is effective as simple and low-cost heat conducting means.

Fourth Embodiment

Figure 8:
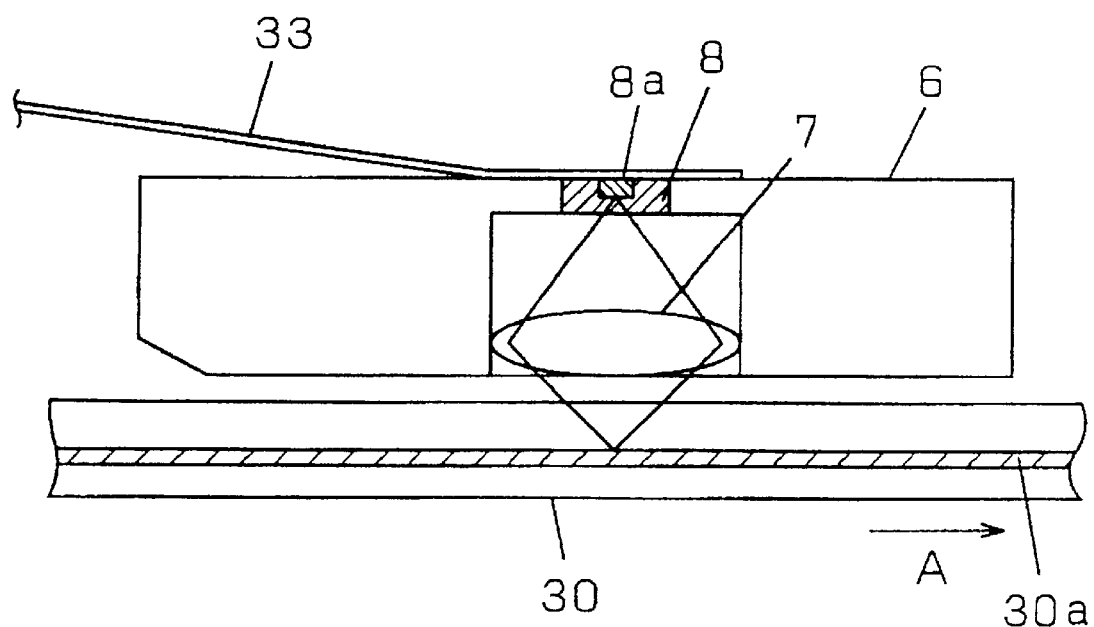
FIG. 8 is a view of a transducer-supporting structure in accordance with a fourth embodiment of the present invention.

FIG. 8 shows an essential part of a transducer-supporting structure in accordance with a fourth embodiment of the present invention. In this embodiment, an optical pickup using a semiconductor laser, which is an electro-optical transducer, is shown as a transducer.

Reference numeral 30 denotes a disk, and 30a denotes a recording film produced by an existing phase change technology etc. Reference numeral 6 denotes a slider serving as a transducer mounting section. The slider 6 floats from the disk 30 by means of a lift of air flow caused by the relative movement of the disk 30 in the direction indicated by the arrow A to keep a predetermined distance.

Reference numeral 8 denotes an integrated optical system serving as a transducer mounted on the slider 6. The integrated optical system 8 includes a semiconductor laser 8a and other optical elements such as a light intercepting element and a light separating element. Reference numeral 7 denotes an object lens mounted likewise on the slider 6.

Reference numeral 33 denotes a suspension. The suspension 33 is connected to the slider 6, and applies a pressing force equal to the lift to the slider 6. Further, the semiconductor laser 8a is in direct contact with the suspension 33 together with the integrated optical system 8. Therefore, in this embodiment as in the case of the first embodiment, the suspension 33 is also used as a thermal coupling member.

The following will be a description of the operation of the transducer-supporting structure constructed as described above.

When the disk 30 turns and has a relative speed with respect to the slider 6, the lift due to air flow increases as compared with the pressing force applied by the suspension 33, so that the slider 6 floats steadily to a height at which these forces are balanced with each other.

A beam emitted from the semiconductor laser 8a passes through the object lens 7 and is converged on the recording film 30a of the disk 30. In the case of recording operation, in this state, the output of the semiconductor laser 8a is modulated according to information to be recorded, by which the modulated information is recorded on the recording film 30a. A servo signal is detected by receiving the return light reflected from the recording film 30a by using a light intercepting portion of the integrated optical system 8. The description of the case of reproducing operation is omitted because this operation is similar to the recording operation.

The semiconductor laser 8a generates a large amount of heat relative to the volume thereof. However, since the suspension 33 is connected to the semiconductor laser 8a, the heat can be dissipated through the suspension 33, so that a rise in temperature of the semiconductor laser 8a can be neglected. For this reason, the life of the semiconductor laser 8a increases. Also, a rise in temperature of the whole of the integrated optical system 8 can be prevented. Therefore, even in the case where an element whose shape is wavelength dependent such as a hologram element is used, the influence of thermal expansion can be neglected, so that the reliability and hostile-environment resistance are improved. Also, a hologram element formed of a resin sensitive to thermal expansion can be used, which achieves a reduction in cost.

As described above, the present invention is effectively applied to a transducer accompanied by heat generation regardless of the type of transducer.

Fifth Embodiment

Figure 9:
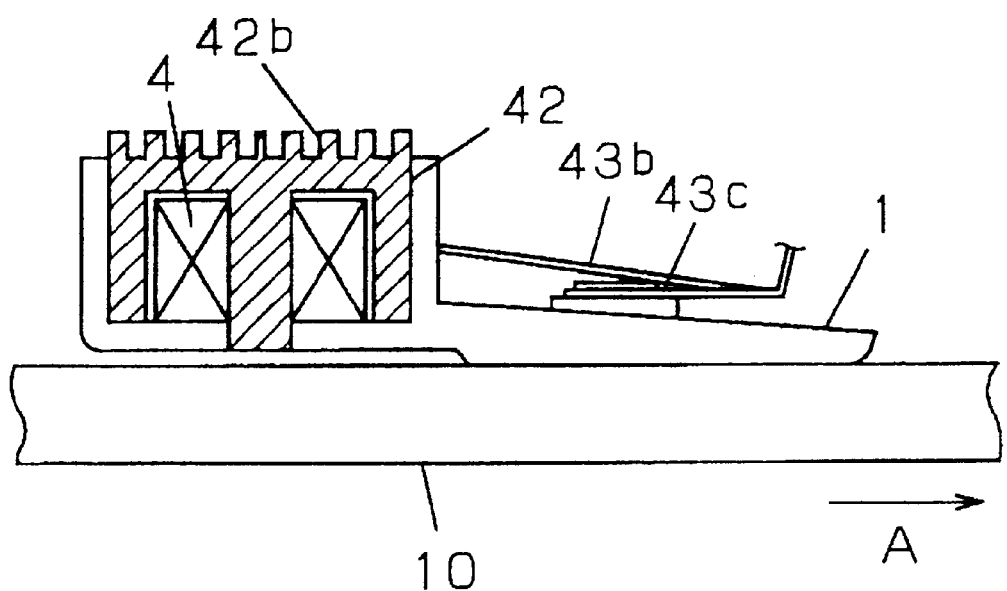
FIG. 9 is a view of a transducer-supporting structure in accordance with a fifth embodiment of the present invention.
Figure 10:
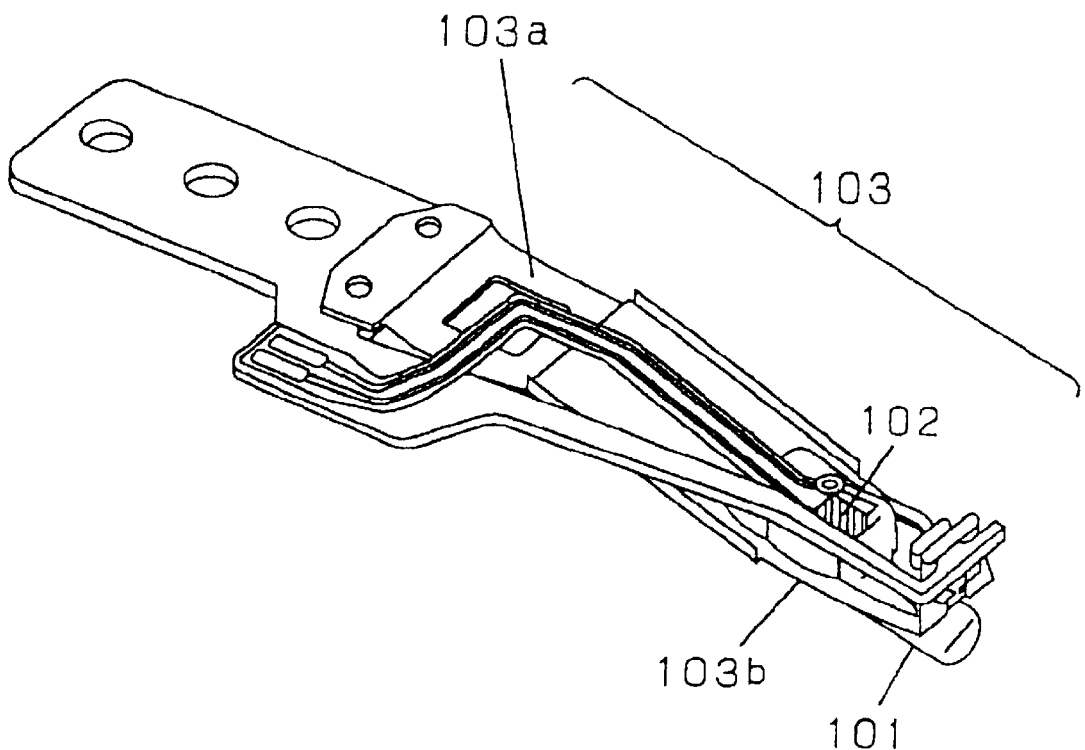
FIG. 10(a) is a perspective view showing a prior art.
FIG. 10(b) is a bottom view of an essential part showing a prior art.
Figure 10:
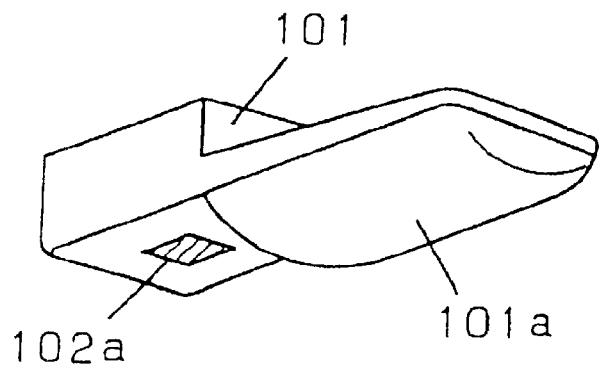
Figure 11:
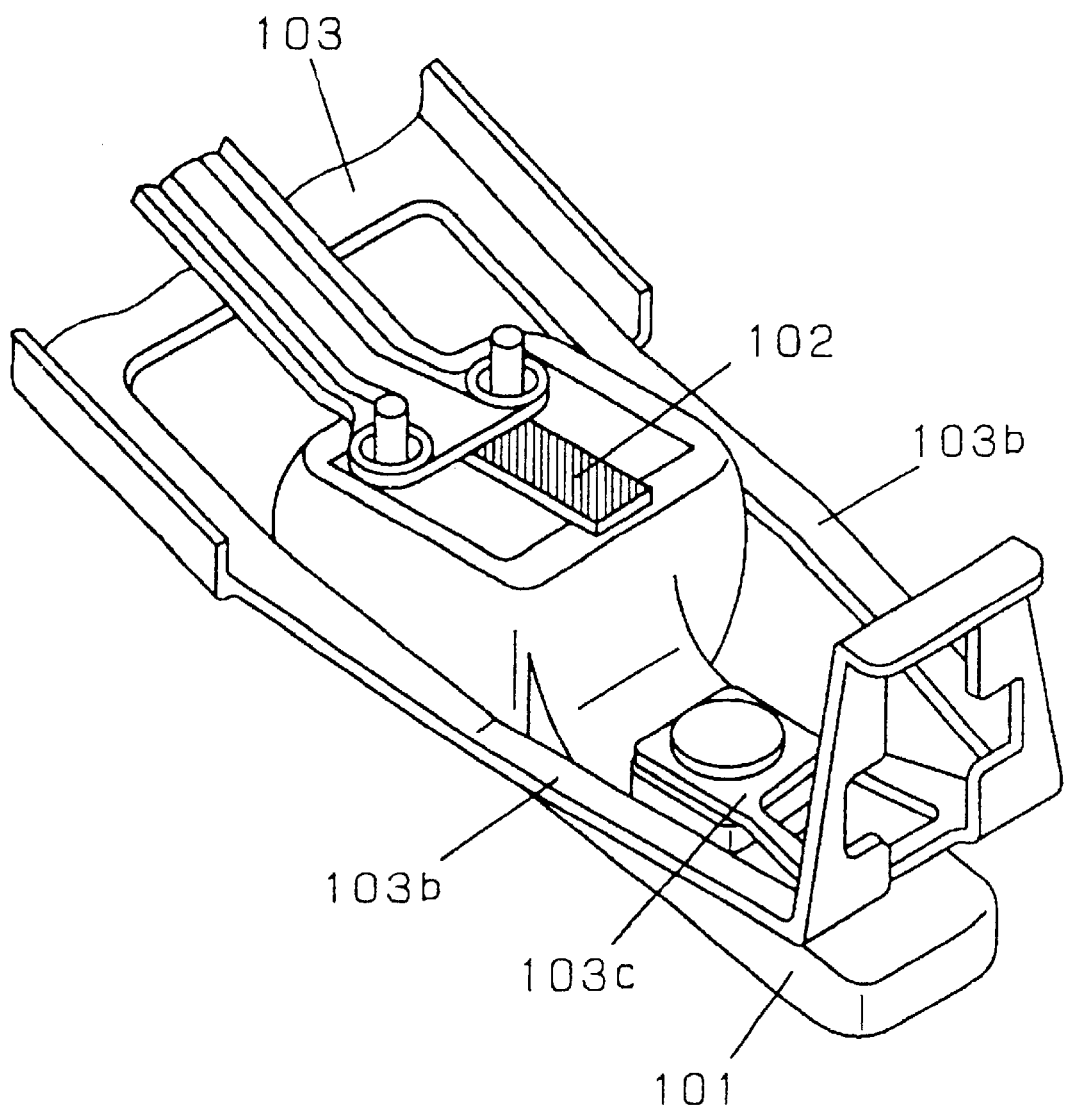
FIG. 11 is a perspective view of an essential part showing a prior art.
Figure 12:
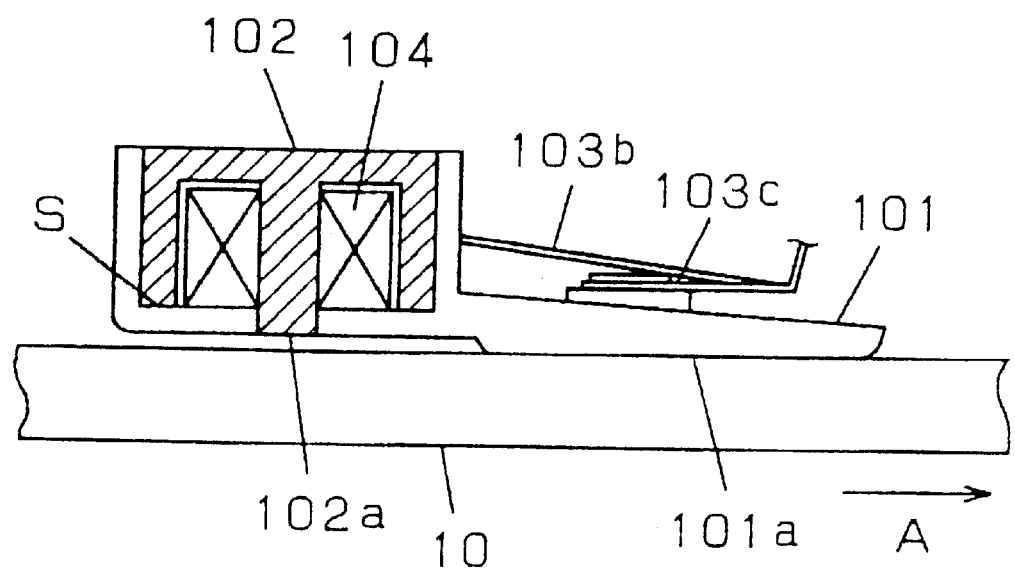
FIG. 12 is an explanatory view of an essential part showing a prior art.

FIG. 9 shows an essential part of a transducer-supporting structure in accordance with a fifth embodiment of the present invention. A slider 1, a coil 4, and a disk 10 are the same as those elements of the first embodiment. Although the whole of a suspension is not shown in FIG. 9, the suspension is the same as the suspension 103 of the conventional example, and a gimbal portion 43b and a tongue 43c are the same as the gimbal portion 103b and the tongue 103c of the conventional example.

A magnetic core 42 has the whole shape that is approximately the same as that of the magnetic core 2 of the first embodiment, but differs from the magnetic core 4 in that the magnetic core 42 has a heat dissipating portion 42b as heat dissipating means.

The operation etc. of the transducer-supporting structure constructed as described above is approximately the same as those of the first embodiment, so that an explanation thereof is omitted. In this embodiment, since the heat dissipating portion 42b is provided on the magnetic core 42, the heat of the magnetic core 42 and the coil 4, serving as an electromagnetic transducer, can be dissipated without the use of a suspension. In order to further increase the heat dissipating efficiency, first to third embodiments etc. can be applied as means of dissipating heat through the suspension and means of preventing the floating of the magnetic core 42.

Although the heat dissipating portion 42a, which is heat dissipating means, is provided integrally with the magnetic core 42 in this embodiment, the heat dissipating portion 42a can be formed of a separate part coupled thermally with the magnetic core 42.

Also, although an electromagnetic transducer has been described as an example in this embodiment, the present invention can be applied effectively to other types of transducers, for example, an electro-optical transducer as described in the fourth embodiment and an electromechanical transducer such as a piezoelectric element.

INDUSTRIAL APPLICABILITY

As described above, according to the present invention, the heat of a transducer is dissipated through a suspension, by which a rise in temperature of the transducer and in the vicinity thereof can be restrained.

Also, by mounting heat dissipating means on the transducer, more effective cooling-can be accomplished.

Thereby, even in the case of high-speed high-density recording, the operation reliability of transducer is maintained, and a part sensitive to thermal expansion can be used, so that a low cost can be attained.

Also, by utilizing an elastic restoring force to position and fix the transducer by means of a part of the suspension, poor positioning etc. caused by a change in temperature can be prevented without an increase in cost, so that an excellent transducer-supporting structure can be provided.

What is claimed is:

1. A transducer-supporting structure, comprising:

a transducer for recording and reproducing information to and from a medium;

a transducer mounting section mounted with said transducer and configured to contact said medium by means of mechanical action or to maintain a fixed distance from said medium;

a suspension which supports said transducer mounting section and elastically positions said transducer in a direction such as to move said transducer to and from said medium; and a thermal coupling member extending between said transducer and said transducer mounting section, said thermal coupling member being formed of a part of said suspension for thermally coupling said transducer with said suspension and being in direct contact with said transducer, wherein at least a part of heat generated in said transducer is dissipated through said via the said thermal coupling member suspension.

2. The transducer-supporting structure according to claim 1, wherein said thermal coupling member has an elastic restoring force, and is in contact with said transducer.

3. The transducer-supporting structure according to claim 1, wherein said transducer is an electromagnetic transducer.

4. The transducer-supporting structure according to claim 1, wherein said transducer is an electro-optical transducer.

5. A transducer-supporting structure, characterized in that said comprising:

a transducer for recording and reproducing information to and from a medium;

a transducer mounting section mounted with said transducer and configured to contact said medium by means of mechanical action or to maintain a fixed distance from said medium;

a suspension which supports said transducer mounting section and elastically positions said transducer in a direction such as to move said transducer to and from said medium; and a thermal coupling member extending between said tranducer and said transducer mounting section for thermally coupling said transducer with said suspension, said thermal coupling member and said transducer or said thermal coupling member and said suspension are at least partially coupled thermally with each other via a viscous fluid; and at least a part of heat generated in said transducer is dissipated through said via the said thermal coupling member suspension.

6. The transducer-supporting structure of claim 1 wherein said thermal coupling member comprises a material of dimension sufficient to provide further elastic force between said transducer and said transducer mounting section.

* * * * *

UNITED STATES PATENT AND TRADEMARK OFFICE
CERTIFICATE OF CORRECTION

PATENT NO.    : 6,731,587 B1
DATED         : May 4, 2004
INVENTOR(S)   : Osamu Mizuno et al.

It is certified that error appears in the above-identified patent and that said Letters Patent is hereby corrected as shown below:

<u>Column 10,</u>
Lines 23 and 53, "via the said thermal coupling member suspension." should read
-- suspension via the said thermal coupling member. --.
Line 32, between "structure," and "comprising:" delete "characterized in that said".
Line 51, "fluid; and" should read -- fluid, and --.

Signed and Sealed this

Fifth Day of October, 2004

JON W. DUDAS
*Director of the United States Patent and Trademark Office*